Patented Sept. 28, 1948

2,450,000

UNITED STATES PATENT OFFICE 2,450,000

EMULSION POLYMERIZATION OF METHYL METHACRYLATE

Benjamin W. Howk, Wilmington, and Frederick L. Johnston, Claymont, Del., assignors to E. I. du Pont de Nemours & Company, Wilmington, Del., a corporation of Delaware No Drawing. Application March 20, 1943, Serial No. 479,894

6 Claims. (Cl. 260—83)

1

This invention relates to new methyl methacrylate compositions and, more particularly, to methyl methacrylate polymer compositions especially adapted for use in molding operations.

Heretofore methyl methacrylate has been polymerized to yield thermoplastic molding compositions. When these polymers are prepared by heating methyl methacrylate monomer either in the absence of catalyst or in the presence of small concentrations of peroxide-type catalyst, the resulting molding compositions are difficult to fuse into optically homogeneous masses under heat and pressure; further, they are too viscous for satisfactory molding by injection. These objections have been overcome in part by several different means. One means has been to conduct the polymerization in the presence of increased concentrations of peroxide-type catalyst. This expedient produces a more moldable product but the high concentration of catalyst residues in the product preclude the preparation of completely colorless moldings, and injection molded articles undergo spontaneous distortion at temperatures considerably lower than do articles prepared by compression molding.

Another means of overcoming the above-mentioned objections has been to prepare polymers from methyl methacrylate at elevated temperatures under pressure whereby a lower molecular weight product is obtained. This product is similar to that prepared with increased catalyst in that it is readily moldable but it yields injection molded articles which distort spontaneously at temperatures considerably below those at which compression molded articles distort. Another method has been to introduce plasticizers or considerable proportions of interpolymer ingredients such as other acrylic and methacrylic esters, vinyl acetate, styrene, and the like, into the molding composition. Methyl methacrylate polymers prepared with these additions are more moldable by injection and fuse readily under pressure to optically homogeneous masses, but whether molded by injection or by compression, they tend to distort at relatively low temperatures.

An object of the present invention is to provide an improved methyl methacrylate polymer molding composition. A further object is to provide such a molding composition which is characterized by good moldability and optical homo-

2 geneity and which will yield both injection molded and compression molded articles having superior resistance to heat distortion. A still further object of the invention is to provide a practical method for preparing methyl methacrylate polymer molding compositions having the characteristics mentioned above.

The above objects are accomplished according to the present invention by forming a dispersion of monomeric methyl methacrylate and 0.01%–3.0%, by weight of the methyl methacrylate, of an aliphatic thiol in water and maintaining this dispersion at a temperature above 100° C. under autogenous pressures until the methyl methacrylate is substantially completely polymerized.

In a preferred method of carrying out the invention, small amounts of benzoyl peroxide or equivalent polymerization catalyst and the selected thiol are dissolved in methyl methacrylate monomer. This solution is suspended in about twice its volume of water containing a small proportion of a mild dispersing agent such as 65% sodium salt of polymethacrylic acid and which is buffered to a pH of about 7.5 by means of a suitable inorganic salt. This mixture is agitated vigorously in a closed reaction vessel capable of withstanding moderate pressures.

The polymerization of the methyl methacrylate is carried out by heating at a temperature of about 110° C. under a pressure of about 45 pounds per square inch for twenty or thirty minutes until the substantial completion of polymerization is indicated by a sudden drop in pressure. It is preferable to prevent the reaction from becoming too violent by suitable cooling of the vessel. The mixture is then cooled and discharged from the reaction vessel and the granular product formed is separated from the mother liquor, washed, centrifuged, and dried by heating at 70° C.–100° C. in a circulating air oven or under vacuum. The dried granular polymer is then masticated on hot mixing rolls for ten to fifteen minutes, removed from the rolls, cooled and comminuted to pass a ⅜ inch screen. The resulting product is well adapted for compression or injection molding and shows special advantages when used for the latter purpose.

The aliphatic thiol compounds used in the present invention, may be prepared by numerous methods, such as the one described by Urquhart et al. in "Organic Syntheses" (Wiley, 1941)

volume 21, page 36. Since a principal objective of this invention is the preparation of color-free molding compositions it is desirable that only thiols of the highest purity be employed.

The following examples will serve to illustrate the types of polymers which may be prepared, the type of aliphatic thiol modifiers which are contemplated and the general conditions under which the polymerization may be carried out. Parts are by weight unless otherwise indicated.

*Example 1*

(a)

| | Parts |
|---|---|
| Distilled water | 4800 |
| Na₂HPO₄·H₂O | 56 |
| 1% water solution of 65% sodium salt of polymethacrylic acid | 480 |

(b)

| | |
|---|---|
| Methyl methacrylate monomer | 2793 |
| Dodecane thiol | 7 |
| Octadecyl alcohol (lubricant) | 28 |

(c)

| | |
|---|---|
| Benzoyl peroxide | 7 |

The ingredients in (a) are dissolved together and charged into a glass, enamel lined, closed reaction kettle capable of withstanding pressures up to 300 lbs./sq. in. and fitted with a stainless steel anchor shaped stirrer, stainless steel baffles, thermo-couple for observing the temperature of the contents, and an outlet through the head to a pressure gauge. The catalyst (c) is freshly dissolved in solution (b) and the resulting solution is charged at once into the reaction kettle. The kettle is sealed and the stirrer is operated at 575 R. P. M. throughout the run. External heat is applied to bring the kettle contents to a temperature of 110° C. within fifteen to twenty minutes at which time the pressure gauge shows about 45 lbs./sq. in. pressure. The heat is then shut off. Within one to two minutes the exothermic polymerization begins and there is a surge of temperature and pressure to 128° C. and 68 lbs./sq. in. where the bulk of the polymerization takes place. Within about five minutes there is a rapid drop in pressure to about 15 lbs./sq. in. and the temperature begins to drop. Stirring is continued until the kettle contents have cooled to 40° C. or below at which time the pressure gauge shows zero pressure and the kettle is opened. The product is found in the form of crystal clear spherical granules up to about 1/64" in diameter. The product is removed from the mother liquor on filter cloth and washed repeatedly with distilled water until the washings are clear. Excess water is removed by means of a centrifuge and the product is dried at 100° C. for twenty-four hours under high vacuum.

The fine granular product is converted to molding powder suitable for injection molding by hot pressing into sheets at 160° C. followed by comminuting into lumps which will pass a 3/8" screen. This powder is then molded in an injection molding machine, suitably a one ounce capacity vertical injection molding machine, which is supplied with a die capable of molding test specimens of the size 2½" x ½" x 0.065". The polymer is injected into the die through a gate at the end of the cavity. Die closing and injection take place during a period of 1.25 seconds. The machine is timed to maintain piston pressure on the molding powder and clamping pressure on the die for fifteen seconds for the molding to set up in the die. A new injection is made every sixty seconds. The polymer may be molded under several temperature conditions to yield specimens of attractive appearance. When the heating cylinder delivers polymer at 220° C. into the cold die, satisfactory moldings are produced under 24,500 lbs./sq. in. piston pressure. At 230° C. the pressure required is 21,000 lbs./sq. in. and at 240° C. 16,000 lbs./sq. in. are required. Under all these conditions moldings of excellent clarity and surface characteristics are obtained which are faithful reproductions of the die cavity. Injection molded strips from the 2½" x ½" x 0.065" die molded at 230° C. as above are found to "soften" at 90° C. according to the following method:

The strip 2½" x ½" x 0.065" is mounted horizontally by one end in a clamp, cantilever fashion, the supported end fitting ¼" into a vertical slot in the clamp so that the strip is supported ¼" from the end. At a spot ¼" from the opposite end on the upper edge a weight of 27.5 g. is placed so that it rests entirely on the test strip and is free to move up or down with the strip. The assembly (excepting the weight) is immersed in a bath of circulating mineral oil which is uniformly heated at a steady rate of 2° C. per minute. The "softening" temperature is observed as that bath temperature at which the test strip sags enough to permit the 27.5 g. weight to drop 0.06". It is to be understood that all softening temperatures of molded specimens subsequently mentioned in this specification are determined by this method.

A strip of similar size is prepared from the above polymer by "compression" molding in a positive action die in which the cold polymer is placed in the die, the die heated at 160° C. under 5,000 lbs./sq. in. pressure for five minutes and the strip ejected after cooling the die and removing pressure. This strip likewise softens at 90° C. according to the above softening temperature determination.

A similar methyl methacrylate polymer polymerized as above but without the addition of dodecane thiol and converted to molding powder in the same manner yields injection molded test strips which soften at 67° C. by the above determination whereas compression molded strips of the same polymer soften at 90° C.

The above example is repeated using varying quantities of dodecane thiol. When the products are worked up and molded as above, injection molded softening temperature specimens are obtained whose softening temperatures by the above method show that a maximum increase in softening temperature is obtained as the concentration of dodecane thiol (based on methyl methacrylate monomer) is increased to the range of 0.25%. Further increase in concentration produces less improvement in softening temperature over the unmodified control. This is illustrated in the following table, taken from the above duplications of this example:

| Concentration of Dodecane Thiol (based on methyl methacrylate monomer) | Softening temperature of injection molded specimen— 2½" x ½" x 0.065" |
|---|---|
| | °C |
| 0.0% (blank for control) | 67 |
| 0.10% | 87 |
| 0.15% | 90 |
| 0.25% | 91.5 |
| 0.37% | 84 |
| 0.50% | 80 |

Example 2

(a)

| | Parts |
|---|---|
| Distilled water | 1230 |
| Na₂HPO₄.12H₂O | 25 |
| 1% water solution of 65% sodium salt of polymethacrylic acid | 30 |

(b)

| | |
|---|---|
| Methyl methacrylate monomer | 980 |
| Dodecane thiol | 1.5 |
| Octadecyl alcohol (lubricant) | 20 |

(c)

| | |
|---|---|
| Benzoyl peroxide | 5 |

The ingredients are charged in the manner of Example 1 into a jacketed stainless steel reaction kettle fitted with paddle type stainless steel stirrers and baffle plates, a thermocouple for observing temperature of the contents and a pressure gauge connection through the kettle head. The kettle is sealed and vigorous stirring is started. Compressed steam is admitted to the jacket to bring the contents of the kettle to a temperature of 103° C. within twenty minutes. A controlled mixture of steam and cold water is then admitted to the jacket to maintain the kettle contents at 103° C. throughout the exothermic reaction which takes place. The pressure is 24 lbs./sq. in. After four to five minutes there is a sudden pressure drop to 7 lbs./in. indicating completion of the polymerization reaction. The contents are cooled and the product is dumped from the bottom of the kettle into a sieve-backed centrifuge where the water is removed and the fine granular product is washed as in Example 1. The product is dried in a circulating air oven at 70° C. for sixteen hours.

The product is converted to molding powder by masticating on hot rolls (about 150° C.) for fifteen minutes followed by removing from the rolls, cooling and chopping to pass a ⅜" mesh screen.

The resulting molding powder is readily injection molded according to the method described in Example 1 at 220° C. under 23,500 lbs./sq. in. piston pressure and at 230° C. under 19,000 lbs./sq. in. piston pressure. Test strips 2½" x ½" x 0.065" injection molded under the former conditions soften at 87° C. according to the determination described in Example 1. The injection molded objects have unusually brilliant surface characteristics and are completely colorless even when viewed endwise through very thick sections. Compression molded test strips 2½" x ½" x 0.065" soften at 90° C.

Example 3

Example 1 is repeated with the single exception that 4.2 parts of octadecane thiol is used in place of dodecane thiol. The product is worked up as in Example 1 and specimens 2½" x ½" x 0.065" injection molded at 205° C. under 26,600 lbs./sq. in. piston pressure are found to soften at 83° C.

Example 4

Example 1 is repeated with the single exception that 1.87 parts of butane thiol is substituted for the dodecane thiol. The product is worked up as in Example 1 and a specimen 2½" x ½" x 0.065" injection molded at 230° C. under 23,000 lbs./sq. in. piston pressure is found to soften at 81° C.

Example 5

Example 1 is repeated with the single exception that 2.7 parts of beta-hydroxyethane thiol is substituted for the dodecane thiol. The product is worked up as in Example 1 and a specimen 2½" x ½" x 0.065" injection molded at 250° C. under 21,000 lbs./sq. in. softens at 91° C.

Example 6

(a)

| | Parts |
|---|---|
| Distilled water | 4800 |
| Na₂HPO₄.12H₂O | 56 |
| 1% water solution of the 65% sodium salt of polymethacrylic acid | 480 |

(b)

| | |
|---|---|
| Methyl methacrylate monomer | 2793 |
| Methyl - alpha - methyl - beta - mercapto - propionate [1] | 7 |

(c)

| | |
|---|---|
| Benzoyl peroxide | 7 |

[1] Prepared according to U. S. Patent 2,268,185.

The process of Example 1 is repeated using the above ingredients and the resulting polymer is worked up and molded as in Example 1. A specimen 2½" x ½" x 0.065" injection molded at 230° C. under 24,000 lbs./in.² piston pressure softens at 92° C.

It will be understood that the above examples are merely illustrative and that the invention broadly comprises polymerizing methyl methacrylate while dispersed in water at temperatures of 100° C. and above under autogenous pressures in the presence of very small amounts of an aliphtic thiol.

The present invention comprises the polymerization of methyl methacrylate in the presence of any compound containing an aliphatic thiol group. The structure and constitution of the remainder of the molecule of the thiol is relatively immaterial although usually it would be objectionable if the molecule contained chromophoric structures which would impart color to the product, or functional groups which are too highly inhibitory to the polymerization of methyl methacrylate.

It is preferable that the thiol should be soluble at least at temperatures of 80° C. and above either in methyl methacrylate monomer or water or both. A specific advantage of such thiols as beta-hydroxyethane thiol, which is soluble both in methyl methacrylate monomer and in water, is that solubility in the monomer permits the use of less of the thiol because of increased opportunity for activity during polymerization, and solubility in water facilitates the removal of any thiol remaining on the surface of the product particles during washing. For practical purposes it is also desirable in some instances that the thiol be either a gas (such as ethane thiol) or a liquid of relatively low boiling point (such as below 150° C.) so that any remaining traces will be more readily removable from the product during drying and hot milling, or that the thiol be a solid under normal conditions or be a liquid of high boiling point (such as above 250° C.) so that any remaining traces in the product would act as placticizers or lubricants and be essentially permanently retained in the product.

The preferred group of aliphatic thiols for use in this invention comprises the hydroxyalkane thiols, and includes beta-hyroxyethane thiol, the use of which is shown in one of the examples. Other specific examples of hydroxyalkane thiols which can be used in this invention are 1-thio-2 - hydroxypropane, 2 - thio - 1-hydroxypropane, 1-thio-2-hydroxy-n-butane, 2-thio-3-hydroxy-n-butane, 1-thio-4-hydroxy-n-butane, 1-thio- 4-hydroxybutene-2, and 1-thiosorbitol. Another especially useful group of aliphatic thiols are the unsubstituted alkane thiols, for example, methyl mercaptan, n-propyl mercaptan, isopropyl mercaptan, n-butyl mercaptan, isobutyl mercaptan, amyl mercaptan, heptyl mercaptan, octyl mercaptan, nonyl mercaptan, hexadecyl mercaptan, pentadecane-thiol-8, ethane dithiol, 1,3-propane dithiol, 1,10-decane dithiol, and 1,12-octadecane dithiol. Other groups of useful aliphatic thiols are the mercapto-aliphatic acids, for example, thioglycolic and beta-mercapto-propionic acid, and the methyl and ethyl esters thereof.

In general, the use of aliphatic thiols as modifiers for methyl methacrylate according to this invention leads to polymers that show superior heat resistance in injection molded specimens. The concentration of the thiol has an important bearing on the properties of the molding resin and for each thiol there is an optimum concentration at which superior effects are obtained. In view of differences in activity of the various aliphatic thiols and their differing relative molecular weights, the weight concentration of thiol required for the maximum effect on softening temperature may be different for each particular compound. In general, the concentration for maximum effect is greater for high molecular weight monothiols than for low molecular weight monothiols, and the requirements for maximum effect using di- and polythiol compounds are less than for corresponding monothiols. Despite such variations in effect, it has been found that the concentration of any aliphatic thiol compound should not be greater than 3% based on the amount of monomeric methyl methacrylate, and usually the effective concentrations are 1% or less, for example, as low as 0.01% for very active thiols.

This invention is applicable not only to compositions in which methyl methacrylate is the sole polymeric compound but also to compositions comprising methyl methacrylate interpolymers containing up to 10%, by weight of the interpolymer, of methyl acrylate, ethyl acrylate, styrene, or vinyl acetate. The proportion of aliphatic thiol compound and the manner of carrying out the invention is essentially the same whether methyl methacrylate is used alone or in admixture, within the above stated proportions, with these other polymerizable compounds.

It is preferred to carry out the present invention by polymerizing methyl methacrylate compositions while dispersed in a non-solvent, such as water. Temperatures of polymerization may be from 100° C. on up to temperatures of 200° C. to 300° C. in closed reaction equipment suitably designed to withstand the autogenous pressures developed. As the reaction temperature is increased, the concentration of benzoyl peroxide catalyst is correspondingly decreased from about 1% (based on methyl methacrylate monomer) at 100° C. to 0.5% in the range of 110° C. to 115° C. and to 0.25% in the range of 120° C. to 130° C. Above this temperature the catalyst concentration is further decreased, and at temperatures of 150° C. and above the catalyst may be omitted entirely. At any given temperature a catalyst concentration is selected which yields a product of suitable molecular weight distribution for optimum molding properties.

Catalysts other than benzoyl peroxide are used in corresponding amounts. Thus, didodecyl peroxide, diethyl peroxide, hydrogen peroxide, persulfuric acid and its salts and similar catalysts may suitably be used.

The use of dispersants such as the 65% sodium salt of polymethacrylic acid is optional. The amount required generally varies in inverse relationship to the degrees of agitation available during polymerization. The amount and effectiveness of the dispersant selected (if any) is preferably so limited as to prevent the formation of a permanent suspension and merely sufficient to keep droplets of the methyl methacrylate composition from coalescing during polymerization. The water phase of the polymerization system may suitably be buffered to a pH at which the selected dispersant is most effective. A pH of less than 4 or above 10 is generally to be avoided because of the tendency of methyl methacrylate monomer to hydrolyze under these conditions.

The products of this invention are useful as molding powders for the preparation of articles by the known methods of compression or injection molding commonly used for shaping thermoplastic materials. When molded by the process of injection molding, the products of this invention have a distinct advantage over previously known methyl methacrylate polymers in that the molded objects show a much greater resistance to distortion by heat.

As many apparently widely different embodiments of this invention may be made without departing from the spirit and scope thereof, it is to be understood that the invention is not limited to the specific embodiments thereof except as defined in the appended claims.

We claim:

1. Process which comprises forming an aqueous dispersion comprising, as the sole polymerizable component thereof, methyl methacrylate and up to 10%, by weight of the mixture therewith, of a vinyl compound from the group consisting of methyl acrylate, ethyl acrylate, styrene, and vinyl acetate, and 0.01%–1.0%, by weight of said methyl methacrylate, of a thiol from the group consisting of alkane and hydroxyalkane thiols, and maintaining the dispersion thus formed at a temperature of at least 100° C. under autogenous pressure until said polymerizable component is polymerized.

2. Process which comprises forming an aqueous dispersion comprising as the sole polymerizable component thereof, methyl methacrylate and up to 10%, by weight of the mixture therewith, of a vinyl compound from the group consisting of methyl acrylate, ethyl acrylate, styrene, and vinyl acetate, and 0.01%–1.0%, by weight of said methyl methacrylate, of an hydroxyalkane thiol, and maintaining the dispersion thus formed at a temperature of at least 100° C. under autogenous pressure until said polymerizable component is polymerized.

3. Process which comprises forming an aqueous dispersion comprising, as the sole polymerizable component thereof, methyl methacrylate and up to 10%, by weight of the mixture therewith, of a vinyl compound from the group consisting of methyl acrylate, ethyl acrylate, styrene, and vinyl acetate, and 0.01%–1.0%, by weight of methyl methacrylate, of beta-hydroxyethane thiol, and maintaining the dispersion thus formed at a temperature of at least 100° C. under autogenous pressure until said polymerizable component is polymerized.

4. Process which comprises forming an aqueous dispersion comprising, as the sole polymerizable component thereof, methyl methacrylate, and 0.01%–1.0%, by weight of said methyl methacrylate, of a thiol from the group consisting of alkane and hydroxyalkane thiols, and maintaining the dispersion thus formed at a temperature of 100° C.–150° C. under autogenous pressure until said polymerizable component is polymerized.

5. Process which comprises forming an aqueous dispersion comprising, as the sole polymerizable component thereof, methyl methacrylate and up to 10%, by weight of the mixture therewith, of a vinyl compound from the group consisting of methyl acrylate, ethyl acrylate, styrene, and vinyl acetate, and 0.01%–1.0%, by weight of said methyl methacrylate, of dodecane thiol, and maintaining the dispersion thus formed at a temperature of at least 100° C. under autogenous pressure until said polymerizable component is polymerized.

6. Process which comprises forming an aqueous dispersion comprising, as the sole polymerizable component thereof, methyl methacrylate and up to 10%, by weight of the mixture therewith, of a vinyl compound from the group consisting of methyl acrylate, ethyl acrylate, styrene, and vinyl acetate, and 0.01%–1.0%, by weight of methyl methacrylate, of octadecane thiol, and maintaining the dispersion thus formed at a temperature of at least 100° C. under autogenous pressure until said polymerizable component is polymerized.

BENJAMIN W. HOWK.
FREDERICK L. JOHNSTON.

REFERENCES CITED

The following references are of record in the file of this patent:

UNITED STATES PATENTS

| Number | Name | Date |
|---|---|---|
| 2,104,760 | Renfrew | Jan. 11, 1938 |
| 2,212,894 | Allen | Aug. 27, 1940 |
| 2,264,376 | Hiltner et al. | Dec. 2, 1941 |
| 2,281,613 | Wollthan | May 5, 1942 |
| 2,284,280 | Habgood et al. | May 26, 1942 |
| 2,326,736 | Adelson et al. | Aug. 17, 1943 |
| 2,344,918 | Johnson | Mar. 21, 1944 |
| 2,346,107 | Johnson | Apr. 4, 1944 |
| 2,380,475 | Stewart | July 31, 1945 |
| 2,396,997 | Fryling | Mar. 19, 1946 |

FOREIGN PATENTS

| Number | Country | Date |
|---|---|---|
| 514,912 | Great Britain | Nov. 21, 1939 |